(12) United States Patent
Rodriguez et al.

(10) Patent No.: US 6,912,686 B1
(45) Date of Patent: Jun. 28, 2005

(54) APPARATUS AND METHODS FOR DETECTING ERRORS IN DATA

(75) Inventors: Humberto Rodriguez, Lexington, MA (US); Natan Vishlitzky, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 799 days.

(21) Appl. No.: 09/691,490

(22) Filed: Oct. 18, 2000

(51) Int. Cl.[7] .................. G06F 11/00; G08C 25/00; H03M 13/00; H04L 1/00
(52) U.S. Cl. .................. 714/799; 714/805; 714/763
(58) Field of Search .................. 714/799, 763, 714/805

(56) References Cited

U.S. PATENT DOCUMENTS

| | | | | |
|---|---|---|---|---|
| 5,248,964 A | * | 9/1993 | Edgard et al. .............. | 345/634 |
| 5,577,196 A | * | 11/1996 | Peer .............................. | 714/4 |
| 6,567,953 B1 | * | 5/2003 | Pomerantz .................. | 714/805 |

* cited by examiner

Primary Examiner—Guy J. Lamarre
(74) Attorney, Agent, or Firm—Barry W. Chapin, Esq.; Chapin & Huang, LLC

(57) ABSTRACT

Mechanisms and techniques allow a data storage system to detect errors in data received for storage within the data storage system. To do so, the data storage system receives, from an originator application operating on a server computer system, portions of data which comprise an application data block which is to be written to storage in the data storage system. In conjunction with the data received at the data storage system, the data storage system also receives application error checking information which the originator application generates on the data within the application data block. The application error checking information may be, for example, checksum information embedded within one or more portions of the data which comprise the application data block. Upon receipt of the data and the application error checking information, the data storage system generates data storage error checking information on the data within all portions of data which comprise the application data block. The data storage system then compares the data storage error checking information against the application error checking information extracted from the portions of data to determine if an error exists in the data prior to storing a data in the data storage system. If an error exists, the data storage system can signal the error back to the server computer system. In this manner, the data storage system can detect errors in real-time in data that the originator application attempts to write to storage within the data storage system prior to storing the data.

29 Claims, 6 Drawing Sheets

APPARATUS AND METHODS FOR DETECTING ERRORS IN DATA

FIELD OF THE INVENTION

The present invention generally relates to systems for detecting errors within data in a data storage system, and more particularly, to systems and techniques which can detect an error in data received for storage by a data storage system, prior to storage of the data.

BACKGROUND OF THE INVENTION

Computer systems and related devices such as networking devices, storage devices, or the like, which are typically controlled by a combination of software and hardware (i.e., electronic circuitry), may undesirably cause errors to occur in data which such devices process. Such errors may be the result of a faulty design of the software or hardware which processes the data, or such errors may be due to natural causes. For example, when two computer systems exchange data over a network, the network may be noisy due to interference or may be otherwise unreliable to accurately transmit the data between the two computer systems. Such conditions in the network may induce errors into the data received at one computer system that causes this data to be slightly (or drastically) different from the original data that was sent from the originating or sending computer system. As another example, computer systems may accidentally induce errors into data if software or circuitry within the computer system contains design faults or unexpectedly fails during normal operation.

Various conventional techniques exists which allow computer software and hardware systems to detect errors that may exist within data being processed by these systems. For instance, in the networking example provided above, it is quite common for a networking protocol to include a checksum value in a packet header of a packet of data which is transmitted onto a network between two computer systems. When the receiving computer system or data communications device receives the packet of data containing the header with the checksum, the receiving device can compute a checksum of its own on the data in the packet and compares the checksum it computes with the checksum in the packet header created by the sending device. If the two checksums are the same, the receiving computer system or device can be fairly certain that the data received in the packet is error free.

Certain conventional software applications embed error checking information such as checksums within application data generated by the software application. For example, a database application such as Oracle, manufactured by Oracle Corporation, manages data in memory as a series of application data blocks. Each Oracle application data block is generally 8K in size (though this size can be configured to be larger or smaller by an Oracle administrator) and includes a checksum embedded within the application data block at a predetermined offset in the data. The Oracle server software application computes this checksum on all of the Oracle database data contained within the application data block. Oracle can use this application data block checksum to ensure that the data in the application data block is not corrupted, for example, when the data is processed by an operating system and written to, and subsequently read from a data storage system.

More specifically, prior to issuing a command to write an application data block to disk storage within a data storage system, the Oracle software application operating on a server computer system computes the checksum on the data and then embeds the checksum within the application data block. Oracle then issues a write command and transfers the application data block to an operating system in the server computer system which handles writing the application data block out of the server to a data storage system. Later, when the Oracle software application subsequently needs to access the data in the application data block (e.g., in response to a client requesting such data from the Oracle database), Oracle issues a read command to the operating system in the server computer system to obtain the application data block from disk storage. The operating system then communicates with the data storage system containing that disk storage over an interface to obtain the application data block and then returns the application data block back to the Oracle server software application. Oracle then re-computes a checksum on any data within the application data block which is returned from the data storage system (in response to the read). The checksum computed upon reading the data is then compared with the checksum that was formerly computed and embedded within the application data block when that application data block was originally written to the data storage system. If the two checksums are the same, the Oracle software application can be reasonably certain that the data within that application data block contains no errors. If the checksums are not the same, the Oracle software application generates an error, for example, to the user, indicating that the data within the application data block is somehow corrupted and that the data cannot thus be read from disk storage.

In the case of an error occurring in the application data block, the corruption may have occurred within either: i) the operating system or hardware (e.g., memory or other circuitry) within the server computer system, ii) networking or interface equipment and/or software that handles transferring the data between the server and the data storage system (i.e., during the write and read operations), or iii) within software, hardware or storage devices (e.g., disks) within the data storage system.

SUMMARY OF THE INVENTION

Conventional error detection techniques used by software applications are limited in their ability to determine a cause of the errors that occur within the application data or a time at which those errors occurred. For example, if the Oracle software application discussed above determines that a checksum error occurs, Oracle is unable to determine with any accuracy when the error occurred or what equipment or software caused the error in the data to occur. Database software applications in general assume that once a write is issued for an application data block, the operating system, any networking protocols, equipment and/or connections, and any data storage systems and software will operate correctly to safeguard the data to ensure that it is processed error free.

More specifically, as explained above, Oracle embeds the checksum information into application data blocks written from Oracle out to disk storage. However, Oracle might not subsequently read those application data blocks for a long period of time after they are written. The time period between writing the data and then reading the data might vary from a few seconds to many hours, days, weeks, months or even years. When the application data block is subsequently read and an error is detected via mismatching checksums, it is extremely difficult to pinpoint the time or source of the error. If the error occurred a long time ago (e.g., many days), it is quite possible that other data contained in other application data blocks is also corrupted within the database as well. It may take quite some time for a database manager to find an archive copy of the database that is free of corrupted errors as it may be unclear as to when the first error took place.

In a typical database system configuration such as Oracle, the Oracle software application executes in conjunction with an operating system which concurrently executes on a server computer system. The server computer system is frequently coupled to a storage area network which may include one or more couplings to data storage systems that store the data within disk drives. Any one of these components may be responsible for inducing an error into the data For example, the operating system may have a fault such as a memory leak which causes data to be corrupted prior to being written to a data storage system. Alternatively, componentry within the storage area network (e.g., switches, cabling, as so forth) may be responsible for inducing the errors into the data. However, since conventional uses of error checking or detection mechanisms which are embedded within application data are limited to error detection within the application that places such error checking mechanisms in the data, their use for real-time detection of errors is limited.

Conversely, the present invention significantly overcomes such limitations. In particular, the present invention includes method embodiments as well as embodiments of data storage systems that perform such methods. Other embodiments include variations of logic instructions (e.g., software code) encoded onto a computer readable medium which can be executed within one or more processing devices with a data storage system to carry out the methods of the invention.

In particular, according to one embodiment of the invention, a method is provided for detecting errors in data to be stored within the data storage system. The method comprises the steps of receiving data at the data storage system and receiving application error checking information at the data storage system. The method then generates data storage error checking information on the data received in the data storage system and compares the application error checking information in a format that is compatible with the data storage error checking information, to the data storage error checking information, to determine if the data received in the data storage system contains an error upon receipt. If the data contains an error, the method provides an indication of the error, and if the data does not contain an error, the method stores the data within the data storage system. In this manner, the system of the invention can detect errors in data immediately upon receipt of the data at the data storage system and before that data is stored within the data storage system.

In another method embodiment, the step of receiving data includes the step of receiving a portion of data and generating data portion error checking information for the portion of data. Such data may be received as a series of one or more I/O write requests sent from a server computer system to the data storage system in order to store portions of data contained in each I/O write request. The method repeats the steps of receiving a portion of data and generating data portion error checking information until all portions of data are received that comprise an application data block for which an application that originates the data computed the application error checking information upon. Accordingly, this method embodiment gathers enough portions of data that contain all of the data of an application data block and then generates the data portion error checking information for each portion of data received.

According to another embodiment of the invention, the data portion error checking information is an N-byte checksum value respectively generated in the data storage system for each portion of data that is received and the step of generating data storage error checking information computes an N-byte value for the data storage error checking information by performing an exclusive-or on all N-byte checksum values for all portions of data that are received that comprise the application data block. In this manner, checksum information is computed in each portion of data received.

In another embodiment, the application error checking information is an M-byte checksum value, computed by the application that originates the data, on all portions of data that comprise the application data block. Also in this embodiment, the method further includes the step of converting the application error checking information M-byte value into an N-byte value such that the step of comparing can compare the data storage error checking information with the application error checking information to determine if the application data block comprised of the portions of data received contains an error. In this embodiment then, it may be the case that the application error checking information may be in a different format (e.g., may be an M-byte checksum value) while the data storage error checking information generated within the invention on the same application data may be in another format (e.g., may be in N-byte checksum value). By converting the application error checking information into a format that is compatible and comparable to the data storage error checking information format, the two values can be compared to determine if an error has occurred in the application data received for storage.

In another embodiment, the application error checking information is embedded within at least one portion of data that is received. Also in this embodiment, the step of converting includes the step of extracting the application error checking information from that portion(s) of data in which the application error checking information is embedded. In this instance, the application error checking information is thus embedded within the application data by the originator application on the server computer system which is attempting to write the data to data storage within the data storage system.

In yet another embodiment, the step of generating data storage error checking information includes the steps of combining the data portion error checking information generated for each portion of data received in order to generate the data storage error checking information, such that the data storage error checking information is comparable in a manner that is compatible with the application error checking information to determine if the application data block comprised of the portions of data received contains an error. In this manner, the data portion error checking information generated for each individual portion of data that makes up an entire application data block can be combined (e.g., via an XOR checksum operation) in order to produce a final resulting data storage error checking information value (e.g., a checksum) which is then comparable to the application error checking information embedded within one or more of the portions of data that make up an entire application data block.

In still another embodiment, the step of receiving data includes the steps of receiving multiple portions of data that comprise an application data block and generating data portion error checking information for each portion of data in the application data block. The step of generating data storage error checking information in this embodiment includes the step of combining the data portion error checking information generated for each portion of data that comprises the application data block in order to generate the data storage error checking information. This method embodiment further includes the step of determining if the application error checking information is comparable to the data storage error checking information, and if it is not comparable, converting the application error checking information into a format that is comparable with the data storage error checking information and proceeding to perform the step of comparing, and if it is comparable, just proceeding to perform the step of comparing. In other words, if the formats of the error checking information are not the sane, one format can be converted to another, whereas if they are the same, they may be compared without a conversion process.

In a further embodiment, the step of generating data storage error checking information generates data storage error checking information on application data for which an application that originates that application data generates the application error checking information upon. In other words, if the originator application produces data contained within application data block and also produces corresponding application error checking information, the step of generating data storage error checking information, as performed by the data storage system of the invention, generates the data storage error checking information on that same application data. Accordingly, when the system of the invention attempts to compare the two error checking information values (e.g., the data storage error checking information value and the application error checking information value), such values will have been computed upon the same application data.

Another embodiment includes the step of receiving a configuration command at the data storage system. The configuration command indicates to the data storage system at least one of i) a designation of a portion of storage within the data storage system for storing the data processed by the steps of receiving, generating and comparing, ii) an indication of areas in the portion of storage that do not contain data including application error checking information, iii) an indication of a location of application error checking information within an application data block that comprises the data that is received, and iv) an indication of a size of the application data block. Such a configuration command can be sent, for example, from a systems administrator (i.e., from a systems management workstation) who manages the data storage system to the data storage system to configure the data storage system to be able to properly detect errors in application data received for storage.

In another embodiment, in response to receiving the configuration command, the data storage system designates the portion of storage within the data storage system for storing the data processed by the steps of receiving, generating and comparing, such that data received, that is to be stored in this designated portion of storage, is subjected to the steps of generating data storage error checking information and comparing the application error checking information to the data storage error checking. In other words, any data to be stored in this designated portion of storage will be subjected to the error detection testing of this invention. Also in this embodiment, an error in the data received that is to be stored in the designated portion of storage is detected upon receipt of the data by the data storage system.

In another embodiment, in response to receiving the configuration command, the step of generating data storage error checking information on the data received in the data storage system excludes generating data storage error checking information on data that is to be stored within the portion of storage that does not contain data including application error checking information. In other words, this embodiment does not perform the error detection of processing to the invention for data that is to be stored within areas of the data storage system that are reserved for data that contains no associated application error checking information.

In another embodiment, the data is database data generated by a database application and the application error checking information is software generated checksum information generated on portions of the database data by the database application and is embedded within the database data received. The step of generating data storage error checking information applies, within the data storage system, a data storage error checking checksum algorithm to the database data received that is compatible with a software application error checking algorithm used by the database application to create the application error checking information. In this manner, the data storage error checking algorithm produces a data storage error checking information result that the step of comparing can use to compatibly compare with the application error checking information to determine if the data received contains an error.

In yet another embodiment, the database application is an Oracle database application and the database data is Oracle database data and the application error checking information is an embedded Oracle checksum received with the Oracle database data at a predetermined offset in an Oracle application data block. This invention is thus particularly useful for detecting error in Oracle data that is sent to the data storage system for storage.

In another method embodiment, the step of comparing determines that the data received in the data storage system contains an error, and the step of providing an indication of the error includes providing, to a software application that originated the data, a rejection of at least one input-output request performed to receive the data in the data storage system.

As noted above, the invention also include embodiments related to data storage systems. In one embodiment, a data storage system is provided that comprises an interface receiving data and receiving application error checking information, an error detection component, at least one storage device, and an interconnection mechanism coupling the interface, the error detection component and the storage device. In this embodiment, the error detection component operates in the data storage system to detect errors in data to be stored within the data storage system. This is done by generating data storage error checking information on the data received by the interface and comparing the application error checking information in a format that is compatible with the data storage error checking information, to the data storage error checking information, to determine if the data received in the data storage system contains an error upon receipt, and if the data contains an error, providing an indication of the error, and if the data does not contain an error, storing the data within the at least one storage device in the data storage system.

The error detection component further includes a data portion error checking information generator coupled to the interface, an application error checking information extractor coupled to the interface, and an a data storage error checking information generator coupled to the data portion error checking information generator. These processing elements operate within the error detection component to carry out the method embodiments summarized above and explained in detail below. In other words, other embodiments of the invention relate to data storage systems configured in various manners, and in particular, to data storage systems which are configured with an error detection component arranged to perform all of the methods and techniques disclosed herein as the invention.

Other embodiments of the invention include logic instructions encoded in a memory system, circuitry or a combination of hardware circuitry and software which can perform all of the methods disclosed herein as the invention. That is, such embodiments may perform all of the aforementioned methods via software control, or via hardware and/or software control configured to perform those methods and the techniques. Such embodiments of the invention may be implemented as one or more software processes, programs, routines, libraries and may execute or otherwise perform collectively as an error detection component within the data storage system.

Other embodiments of the invention include computer program products having a computer-readable medium including computer program logic encoded thereon that when performed on a host computer system, causes the host computer system to detect errors within data to be stored in the data storage system. In such embodiments, when the computer program logic is performed on a processor in a data storage system, the computer program logic causes the processor to perform any or all of the method operations disclosed herein as the invention. These embodiments of the invention are typically provided as software on a computer readable medium such as an optical medium (e.g., CD-ROM), floppy or hard disk or other such medium such as firmware code in one or more ROM or RAM or PROM chips or as an Application Specific Integrated Circuit (ASIC). The software or firmware or other such configurations can be installed onto a data storage system to cause the data storage system to perform the techniques explained herein as the invention.

It is to be understood that the system of the invention can be embodied strictly as a software program, as software and hardware, or as hardware alone. Is also to be understood that the error detection processes of this invention typically perform (e.g., execute, run, or are otherwise operated) within or in conjunction with the data interface of the data storage system that initially receives data for storage, though such processing may occur within any other componentry within the data storage system as well.

A data storage system to which this invention may apply may be a simple single disk system or may be a highly complex large-scale file server, RAID array or other type of data storage system. An example of such a data storage system is the Symmetrix line of data storage systems manufactured by EMC Corporation of Hopkinton, Massachusetts. The invention may also be embodied in software applications manufactured by EMC Corporation.

DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

The present invention provides techniques and mechanisms that allow a data storage system to detect errors, should they exist, within application data received for storage within the data storage system. Generally, the system of the invention is applicable in situations where data to be stored in a data storage system includes associated application error checking information. Such application error checking information may, for example, be embedded within the data itself according to a format determined by a software application or other entity that created the application data. By way of example, a data storage system equipped with this invention may process Oracle application data blocks containing embedded Oracle checksum information upon receipt by the data storage system to detect errors in the Oracle application data contained within those Oracle application data blocks. By performing the error detection techniques of this invention within the data storage system immediately upon receipt of the data, errors in the data may be detected in real-time. This allows a systems administrator or Oracle administrator to more accurately find the cause of the errors.

Figure 1:
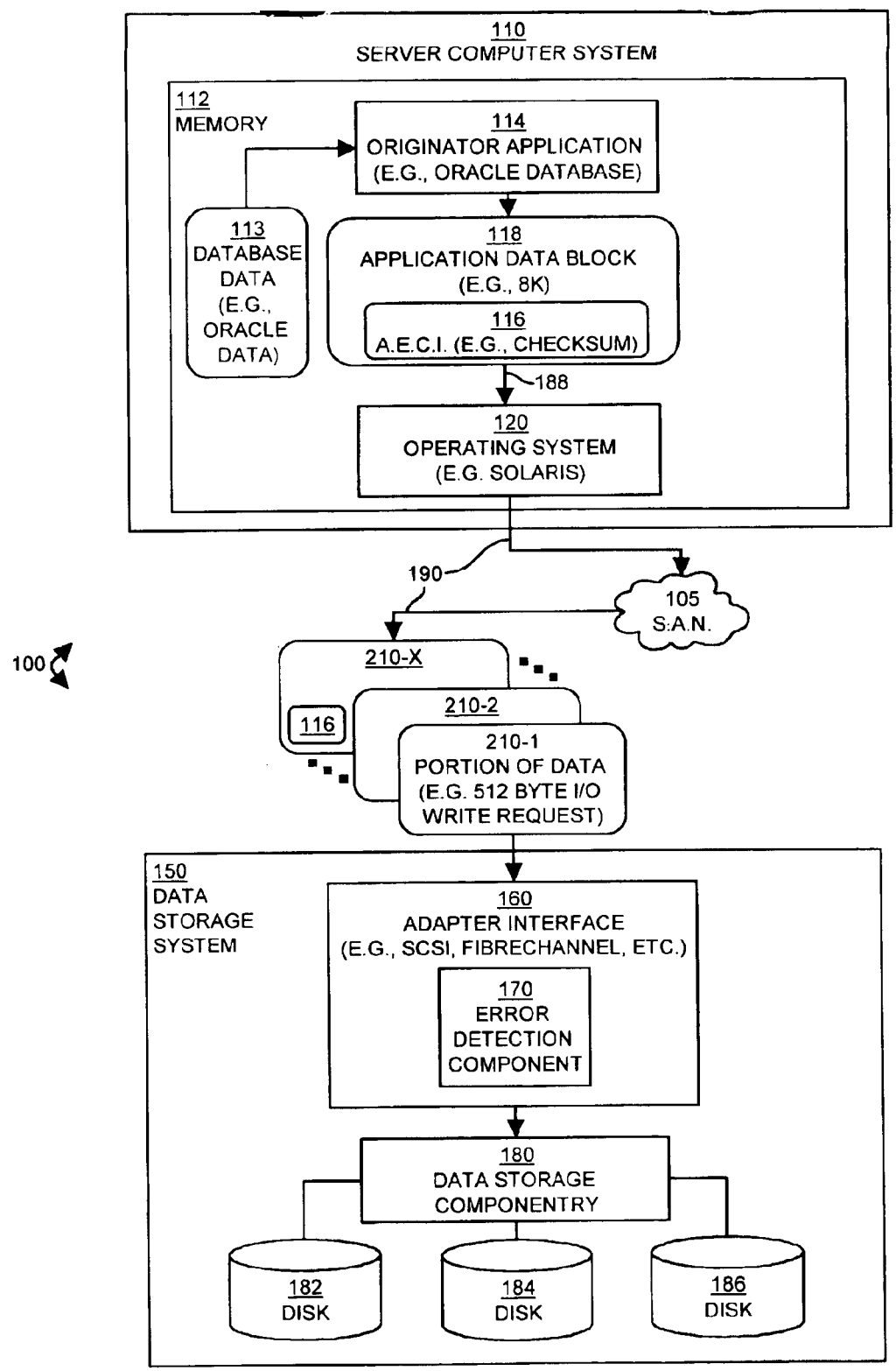
FIG. 1 illustrates a computing system environment including a server computer system coupled to a data storage system that includes an error detection component configured according to one embodiment of the invention.

FIG. 1 illustrates an example of a computing system environment 100 configured according to one embodiment of the invention. Generally, this simple example computing system environment 100 includes a server computer system 110 coupled via a storage area network (SAN) 105 to a data storage system 150. The storage area network 105 may include equipment (e.g., switches, data communications links, and so forth, not specifically shown) to channel or route data between the server computer system 110 and the data storage system 150 for storage thereto or access therefrom. It is to be understood that a storage area network 105 is not required, and that there may be a direct connection between the server computer system 110 and the data storage system 150.

The server computer system 110 includes a memory 112 encoded with database data 113, an originator application 114, one or more application data blocks 118 (only one shown in this example) and an operating system 120. Each application data block 118 includes application error checking information (A.E.C.I.) 116. In this example, the database data 113 is Oracle data in use (i.e., accessible in memory 112) by the originator application 114, which is an Oracle database server application. Also in this example, the application data block 118 is an Oracle application data block which is generally configured (e.g., by an Oracle administrator) to be 8-kilobytes in size and the application error checking information 116 is checksum information which the Oracle database application 114 generates and embeds (e.g., at a predetermined offset) within the application data block 118 before execution of a write operation to write the application data block 118 to data storage.

The example data storage system 150 includes an adapter interface 160 (e.g., a host/bus adapter), data storage componentry 180 and a plurality of data storage devices which, in this example, are disk drives 182 through 186. The adapter interface 160 is encoded with an error detection component 170 configured according to at least one embodiment of this invention. Though not specifically shown, the adapter interface 160 110 also includes a SCSI, Fibrechannel, ESCON, or other type of high speed peripheral data interface that is capable of sending and receiving portions of data 210-1 through 210-X between the server computer system 210 and the data storage system 150 (e.g., via equipment within the SAN 105).

Generally, and as will be explained in more detail, the error detection component 170 within the adapter interface 160 is able to detect errors in real-time that may occur when the originator application 114 within the server computer system 110 transfers (e.g., writes) the application data block 118 from the server computer system 110 to the adapter interface 160 for storage within the data storage system 150. The error detection component 170 detects such errors by comparing the application error checking information 116 embedded within the portion(s) of data 210 for an application data block 118 with data storage error checking information (not specifically shown) that the error detection component 170 generates on its own on data in the portions of data 210 that comprise that application data block 118.

Figure 2:
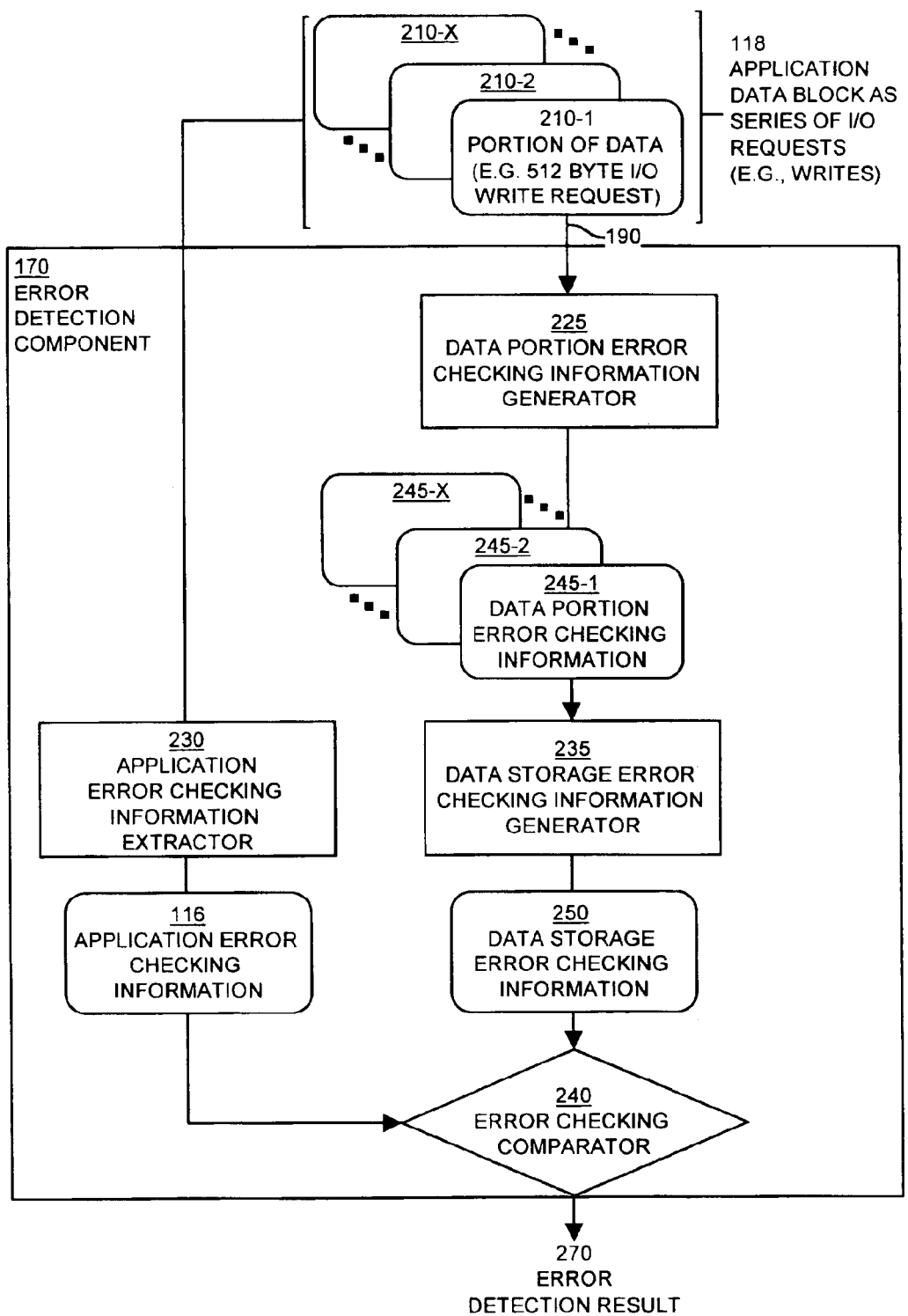
FIG. 2 illustrates how an error detection component within a data storage system configured according to the invention can detect errors in data received for storage at the data storage system.

FIG. 2 illustrates a high-level architecture of the error detection component 170 configured according to an example embodiment of the invention. The error detection component 170 contains processing elements that include a data portion error checking information generator 225, an application error checking information extractor 230, a data storage error checking information generator 235 and an error checking comparator 240. These processing elements 225, 230, 235 and 240 may be embodied as hardware (e.g., circuitry), software, or a combination of hardware and software (e.g., firmware) within the error detection component 170 in the data storage system 150. Such processing elements 225, 230, 235 and 240 carry out the techniques as explained herein to detect errors in data received for storage in the data storage system 150.

Prior to describing the operation of these processing elements in detail, a brief explanation of the operation of a conventional server computer system 110, such as that illustrated in FIG. 1, will be provided to assist the reader in understanding the details of the operation of a data storage system 150 equipped with an error detection component 170 configured according to embodiments of the invention.

Returning attention now to FIG. 1, suppose that the originator application 114 in the server computer system 110 determines that database data 113 must be written (i.e., stored) to the data storage system 150. To perform this operation, the originator application 114 formats the database data 113 into the application data block 118. During the creation and formatting of the application data block 118 (or during the write operation), the originator application 114 computes the application error checking information 116, which in this example may be a checksum value computed on all of the database data 113 contained within the application data block 118. The originator application 114 embeds the application error checking information 116 at a predetermined location within the application data block 118. Once the application data block 118 is complete in this manner, the originator application 114 then issues (or completes) the application data block write operation 188 to the operating system 120. In response, the operating system 120 receives the entire 8-kilobyte application data block 118 (e.g., as a data structure in memory) and issues a series of one or more input-output (I/O) write requests 190 to the data storage system 150.

Each I/O write request 190 handles the transfer of a single portion of data 210 from the operating system 120 to the data storage system 150. In this example, which is not meant to be limiting, each I/O write requests 190 transfers a 512 byte portion of data 210 to the data storage system 150. Accordingly, for the example 8-kilobyte application data block 118, the operating system 120 issues sixteen (16) I/O write requests 190 each containing a 512-byte portion of data 210 in order to "write" the entire 8-kilobyte application data block 118 to the data storage system 150. It is to be understood that in some configurations, it may be the case that the size of the application data block 118 is equivalent to, or smaller than the amount of data that can be transferred in an I/O write request 190. Preferably, the amount of data that an I/O request 190 can transfer is exactly the size of an application data block 118, though this is not meant to limit the invention as such.

Also of particular importance to this invention is that at least one portion of data 210 (210-X in this example) includes the embedded application error checking information 116 which the originator application 114 embeds in the application data block 118. This is by way of example only, and thus if other techniques are employed by the server computer system 110 and/or the originator application 114 to send application error checking information 116 to the data storage system 150, then the invention is applicable to systems that use such techniques as well. For example, the application data block 118 may contain only application data and no application error checking information. Instead, it might be the case that the originator application 114 sends the application error checking information 116 to the data storage system 150 out-of-band (e.g., via a separate communications message) from the application data block 118.

The processing described up to this point, which takes place in the server computer system 110, is conventional application and operating system processing that takes place in server computer systems 110 that execute or otherwise perform originator applications 114 such as Oracle. Using the example set forth thus far then, an example operation of the data storage system 150 configured in accordance with embodiments of the invention will now be provided.

Figure 3:
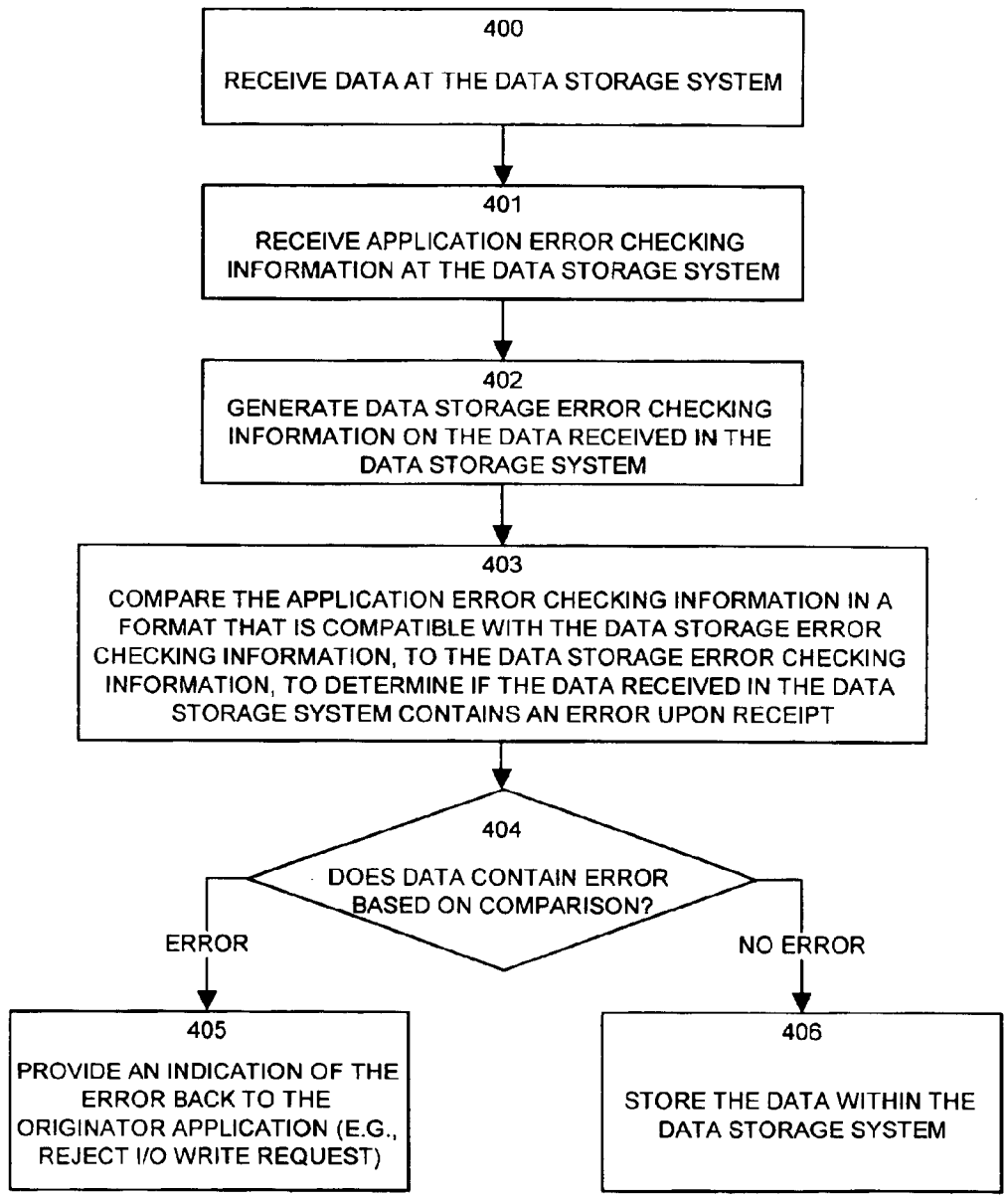
FIG. 3 is a flow chart of the general processing steps performed that cause a data storage system to detect errors in data received for storage in the data storage system.

FIG. 3 is a flow chart of processing steps 400 through 406 that show the high-level operation of the data storage system 150 equipped with the error detection component 170 configured according to one embodiment of the invention. An explanation of the processing steps in FIG. 3 will be provided with reference to the aforementioned example operation of the server computer system 110 and the illustrations in FIGS. 1 and 2.

In step 400, the data storage system 150 receives data from the server computer system 110. In particular, with respect to FIG. 2, the error detection component 170 which resides in the adapter interface 160 receives the application data block 118 as a series of one or more I/O requests 190 (e.g., write requests) that each contain a respective portion of data 210-1 through 210-X.

In step 401, the application error checking information extractor 230 receives or extracts the application error checking information 116 embedded within one or more portions of data 210 received in step 400. For example, the application error checking information extractor 230 can extract the application error checking information 116 from a predetermined (or dynamically determined) location within one or more of the portions of data 210, once the adapter interface 160 receives (e.g., buffers) those portions of data 210.

Next, in step 402, the data portion error checking information generator 225 and the data storage error checking information generator 235 operate collectively to generate data storage error checking information 250, based on the portions of data 210 received in the data storage system 150 that comprise an entire application data block 118. As specifically illustrated in the embodiment shown in FIG. 2, step 402 is actually a two-stage process.

In the first stage, for each received portion of data 210-1 through 210-X, the data portion error checking information generator 225 generates corresponding respective data portion error checking information 245-1 through 245-X. In other words, data portion error checking information generator 225 generates a separate respective data portion error checking information value 245 for each portion of data 210-1 through 210-X.

In the second stage of step 402, the data storage error checking information generator 235 collectively processes all of the individual data portion error checking information values 245 for each portion of data 210-1 through 210-X that comprise (i.e., that make up) an entire application data block 118 to produce data storage error checking information 250.

Next, in step 403, the error checking comparator 240 compares the application error checking information 116 (received and/or extracted from one or more portions of data 210 in step 401) in a format that is compatible with the data storage error checking information 250, to the data storage error checking information 250, to determine if the application data block 118 (comprised of one or more portions of data 210) received in the data storage system 150 contains an error upon receipt within the data storage system 150. The error checking comparator 240 provides an indication of whether or not an error is present in the application data block 118 via the error detection result 270.

Note that in step 403, it is implied that the application error checking information extractor 230 must supply the application error checking information 116 in a format that is compatible with the data storage error checking information 250. It may be the case, for example, that the originator application 114 encodes the application error checking information 116 in a specific format which may or may not be the same as a format of the data storage error checking information 250 produced by the data portion error checking information generator 235. As will be explained shortly, the application error checking information extractor 230 in this embodiment is responsible for both extracting and properly formatting the application error checking information 116 so that the error checking comparator 240 can compare this against the data storage error checking information 250 to determine if they are the same or not.

Next, in step 404, the data storage system 150 (e.g., the adapter interface 160 that receives the portions of data 210 that comprise an entire application data block 118) analyzes the error detection result 270 to determine if the data in the application data block 118 (i.e., one or more portions of data 210) contains an error based on the comparison provided by the error checking comparator 240.

The error detection result 270 may indicate that an error is present within the data of the application data block 118 and thus the data storage system 150 should reject this application data block 118 for storage. In this case, the data storage system (e.g., the adapter interface 160) performs step 405 to provide an indication of the error back to the originator application 114, for instance, by rejecting at least one I/O write requests 190 for at least one portion of data 210-1 through 210-X that contains data for the application data block 118 which contains the error.

Referring attention briefly again back to FIG. 1, in a typical server computer system 110 installation, when the operating system 120 receives the rejection of one (or more) I/O write requests 190 that contained data for an application data block 118, the operation system 120 implements an "all-or-nothing" approach such that if any I/O write request 190 for an application data block 118 are signaled as an error by the data storage system 150, the operating system 120 signals to the originator application 114 that the whole originator application write instruction 188 (i.e., for application data block 118) contained an error. Thus, in one embodiment of the invention, once the data storage system 150 receives the portion of data 210-X that includes the final amount of data thus constituting an entire application data block 118 (and thus the data storage system 150 has all of the data for the application data block 118), if the system of the invention then detects an error within this application data block 118 in steps 403/404 in FIG. 3 (i.e., within the data contained in each portion of data 210-1 through 210-X that constitutes the complete application data block within the data storage system 150), then the data storage system 150 rejects (not specifically shown in figures) the last I/O write request 190 for that last portion of data 210-X. The operating system 120 within the server computer system 110 that attempted to write the application data block 118 in the first place then receives such a rejection of the I/O write request 190 for the portion of data 210-X and thus signals a rejection to the originator application 114 of the entire application data block write request 188.

Returning attention now back to FIGS. 2 and 3, alternatively, the error detection result 270 may indicate that the application data block 118 is error-free and is to be stored within data storage system 150, in which case processing proceeds from step 404 to step 406 at which point the data storage system 150 stores the data (e.g., within disks 182 through 186).

Preferably, certain processing operations of the error detection component 170 of this invention operate during receipt of the data (i.e., portions of data 210) at the data storage system 150, such that system of the invention can then detects errors in an entire application data block 118, once the data storage system 150 has received all of the portions of data 210 for that application data block 118. Accordingly, the system of the invention can detect errors in application data almost immediately after the originator application 114 attempts to write the application data block 118 to storage and before the application data block 118 is actually stored. Since the application data is not held for prolonged periods of time in a data storage system prior to detection of such errors (i.e., the errors can be detected upon receipt of the last portion of data for an application data block 118), the system of the invention can provide real-time signaling (e.g., step 405 in FIG. 3) back to the originator application 114 performing within server computer system 110 to indicate to the originator application 114 that there is a problem in transmitting the data to the data storage system 150. At that point, the originator application 114 can, for instance, decide to attempt to retransmit the application data block 118 in which the error occurred, or, the originator application 114 may decide to halt further processing until the cause of the error can be discerned.

Figure 4:
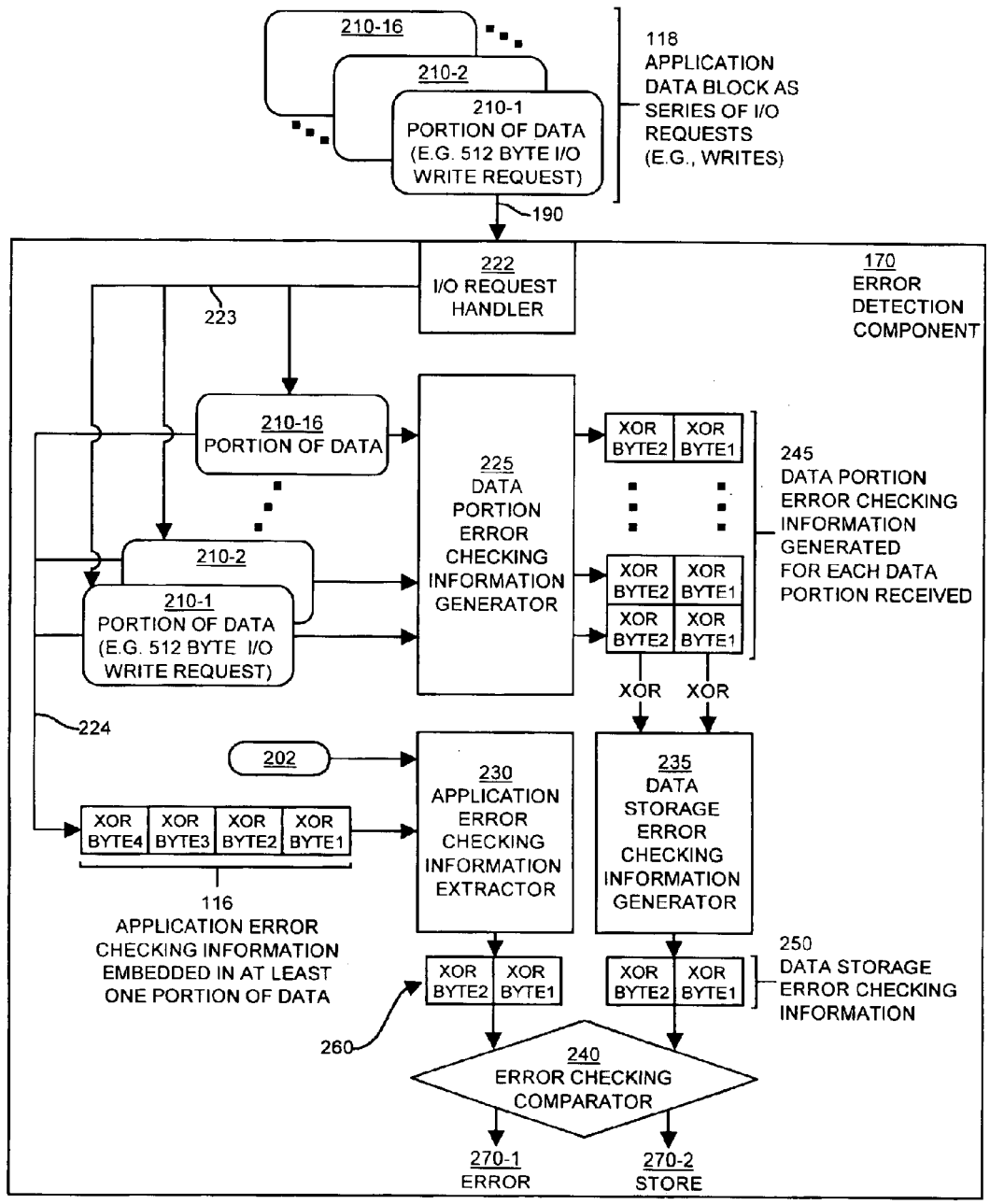
FIG. 4 illustrates a more detailed architecture and data flow of the error detection component within the data storage system that can detect errors in data received by the data storage system according to one embodiment of the invention.

FIG. 4 illustrates a more detailed embodiment of an error detection component 170 configured according to invention. The illustration of the error detection component 170 configured FIG. 4 shows how the error detection component 170 can generate data storage error checking information 250 according to one format and how it can then compare this data storage error checking information 250 to the application error checking information 116 which may be in a slightly different format upon receipt within a portion of data 210 at the data storage system 150.

FIG. 4 also illustrates how the error detection component 170 can receive a configuration command 202 and can configure the data storage system 150 with information contained within the configuration command 202 to understand, among other things, a specific format of data that an originator application 114 provides in an application data block 118 for storage within the data storage system 150. For example, the configuration command 202 can indicate to the error detection component 170 where the embedded application error checking information 116 is located (e.g., at what offset) within one or more portions of data 210 that makeup the application data block 118.

The architecture of the error detection component 170 illustrated in FIG. 4 is similar to that of the architecture illustrated in FIG. 2 except that the error detection component 170 in FIG. 4 includes an I/O request handler 222 which receives the I/O requests 190 and extracts (shown by lines 223) the portions of data 210 from the I/O requests 190. The portions of data 210 are then buffered in a memory (not specifically shown in this figure) accessible by the error detection component 170 while they are being processed according to the system of this invention. Also, the architecture illustrated in FIG. 4 illustrates in a bit more detail the results of processing operations related to the generation of error checking information values 250, 260.

Figure 5:
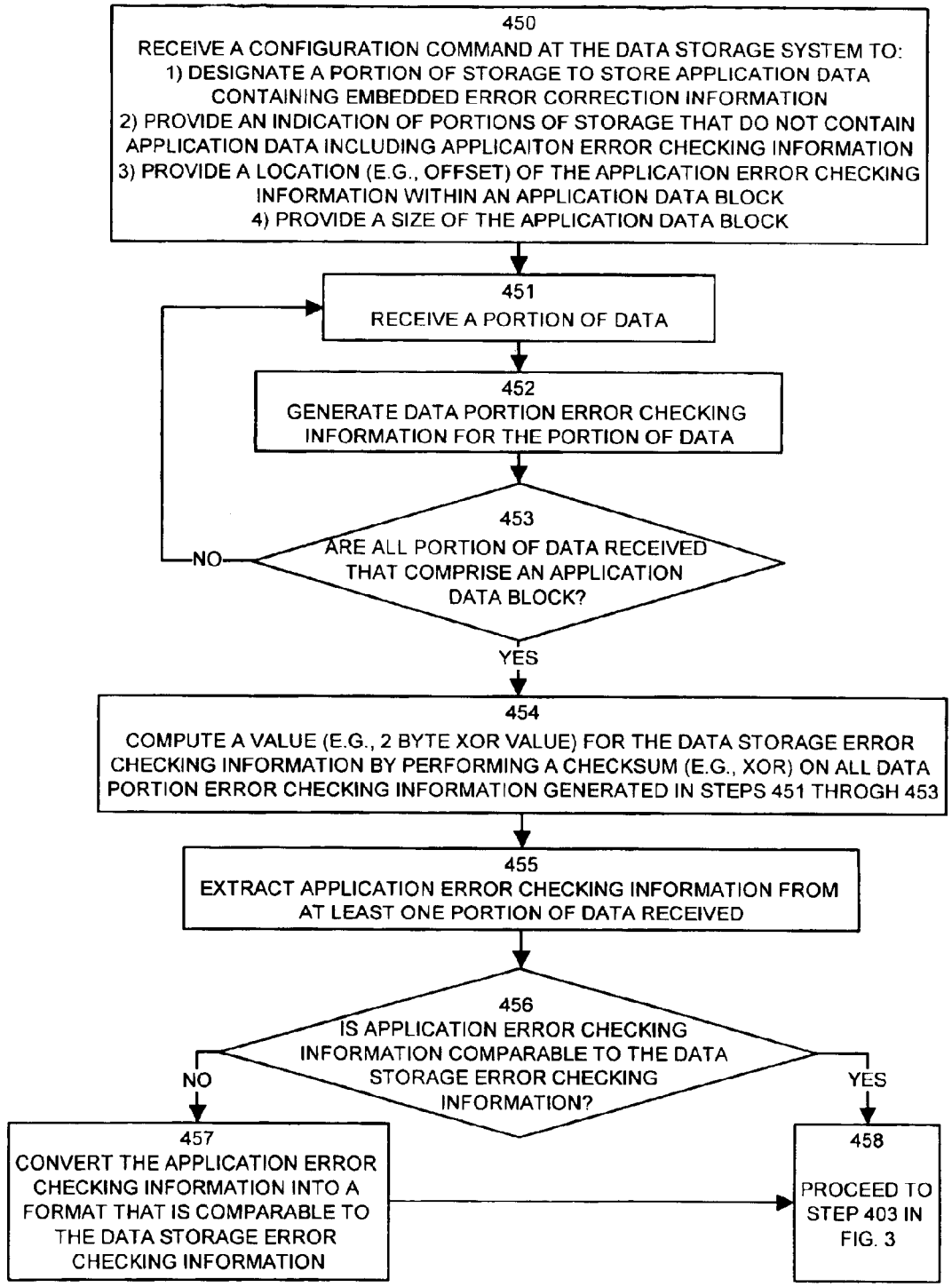
FIG. 5 is a flow chart of processing steps that show certain details of the operation of the system of the invention within a data storage system to detect errors in data received for storage in the data storage system.

FIG. 5 is a flow chart of processing steps which show the operation of the error detection component 170 as illustrated in FIG. 4. The description of the operation of the error detection component 170 in FIG. 4 will now be described in relation to the processing steps in FIG. 5.

In step 450, the data storage system 150, and in particular, the error detection component 170, receives a configuration command 202 which contains information that serves a number of purposes in the context of this invention. In a preferred embodiment, the systems administrator of the data storage system 150 provides the configuration command 202 once during a configuration process (not specifically shown) of the data storage system 150 in order to properly configure the error detection component 170 within the data storage system 150 to perform according to the invention for application data to which the system of the invention is to be applied.

In this particular embodiment, which is not meant to be limiting of the invention, the configuration command 202 contains four parts: Part 1 designates a portion of storage within the data storage system that can be used to store application data containing embedded error correction information, Part 2 provides an indication of portions of storage that do not contain application data including error correction information, Part 3 provides a location (e.g., an offset) of the application error checking information 116 within an application data block 118, and Part 4 provides a size of the application data block 118.

In the configuration command 202, the designation of the portion of storage (i.e. Part 1) that can be used to store application data containing embedded error correction information (e.g., application data blocks 118 containing application error correction information 116) may be, for example, one or more volumes within the data storage system 150 that are designated for storing data to which the error detection techniques of this invention are to be applied. Such a designation of a portion of storage allows the adapter interface 160 (FIG. 1) to recognize I/O requests 190 that attempt to access (e.g., write) data in this portion of storage. In other words, Part 1 of the configuration command 202 indicates to the data storage system 150 which storage areas within the data storage system 150 are subject to the error checking techniques of the invention and thus when the data storage system 150 receives I/O write requests 190 for data to be stored in those storage areas, the adapter interface 160 can trigger the error detection component 170 of the invention to perform the operational techniques of the invention to detect errors in that data prior to this data being written to that storage area.

Part 2 of the configuration command 202 indicates which portions of the storage area designated in Part 1 are not subject to the error detection techniques of the invention. By way of example, an Oracle database application typically requires a predetermined amount of storage space on a raw volume to be allocated for Oracle header information. Such Oracle header information is distinct from Oracle database data upon which Oracle generates the application error checking information 116 (e.g. a checksum). Specifically, Oracle header information does not contain embedded checksum application error checking information 116. Accordingly, Part 2 of the configuration command 202 identifies any areas within an Oracle raw volume partition that will not contain data that is subject to the error detection techniques of the invention. Therefore, when the data storage system 150 receives I/O write requests 190 containing Oracle header information (i.e., as identified by an I/O write request 190 to the designated portions of storage identified in Part 2 of the configuration command 202), the adapter interface 160 will not invoke operation of the error detection component 170 for data in those I/O write requests 190 since the Oracle header information in these requests 190 will not contain embedded checksum information.

Part 3 of the configuration command 202 provides a location of the application error checking information 116 within an application data block 118. The location may be, for example, one or more offsets into the application data block 118 at which locations Oracle checksum information resides which is embedded along with the data in a particular portion of data 210. Alternatively, the location specified in Part 3 of the configuration command 202 may be a formula, address or other mechanism that the application error checking information extractor 230 may use to properly obtain the application error checking information 116 from within one or more of the appropriate portions of data 210 which comprise an entire application data block 118. This location information allows the application error checking information extractor 230 to properly locate the application error checking information 116 within an appropriate portion of data 210 in the application data block 118.

Part 4 of the configuration command 202 provides a size of the application data block 118 in order to allow the error detection component 170 of this invention to determine when all of the portions of data 210 that make up (i.e., that contain data for) an application data block 118 have been received within the adapter interface 160 of the data storage system 150. For the example system illustrated in FIG. 1, Part 4 of the configuration command 202 indicates that the application data block 118 is 8-kilobytes in size.

Referring again now to the flow chart of processing steps shown in FIG. 5, once the data storage system receives and processes the configuration command 202, in step 451 the data storage system 150 receives a portion of data 210. As explained above, the data storage system 150 may receive a portion of data 210 via an I/O write request 190. For the present explanation, it will be assumed that the I/O write request 190 provides a portion of data 210 to which the error detection techniques of the system of the invention are to be applied. In other words, the portion of data 210 in step 451 contains data which is part (or all) of an application data block 118 that contains data to be stored in the storage area designated in Part 1 of the configuration command 202. As illustrated by the arrows 223 in the embodiment in FIG. 4, as the I/O requests handler 222 directs each portion obtain 210 to a buffer area for processing by both the data portion error checking information generator 225 and by the application error checking information extractor 230.

Next, in step 452, the data portion error checking information generator 225 generates data portion error checking information for each portion of data 210 received. As illustrated in FIG. 4, in this example, there are sixteen portions of data 210-1 through 210-16 for which the data portion error checking information generator 225 generates a respective data portion error checking information value 445 to produce sixteen two-byte checksum values which are shown collectively as data portion error checking information 245. Specifically, for each portion of data 210, the data portion error checking information generator 225 performs an XOR operation on all of the data contained within that portion of data 210 to produce it 2-byte XOR checksum value.

In this example embodiment, the data portion error checking information generator 225 is illustrated as a component within the error detection component 170. However, certain data storage systems 150, such as the Symmetrix line of data storage systems manufactured by EMC Corporation of Hopkinton, Massachusetts, include circuitry within, for example, the adapter interface 160 in the data storage system 150 to natively compute 2-byte XOR values on portions of data received in I/O requests 190. The native or conventional use of such 2-byte XOR values is to store such 2-byte XOR values along with their respective portions of data 210 within the disks 182 through 186 within the data storage system 150. Once stored in this manner, should those portions of data 210 be accessed in a future, for example, in response to an I/O read request for those portions of data 210, the native 2-byte XOR values are used to check for error in the data That is, in response to a read, before the data storage system 150 transmits the portion of data 210 from the data storage system 150, the adapter interface 160 can compute a new 2-byte XOR value on the portion of data 210 read from the disks 182 through 186 and can compare this new 2-byte XOR value to the original native 2-byte XOR value that was stored along with the portion of data 210, in order to ensure that the portion of data 210 being read does not contain any errors.

In the context of this invention, the point of this discussion of conventional techniques is that certain data storage systems 150 already contain circuitry and/or software that is designed to compute a 2-byte XOR checksum value on a portion of data 210 received via an I/O request 190. Accordingly, such existing circuitry and/or software within the adapter interface 160 of a conventional data storage system 150 (e.g., an EMC Symmetrix data storage system) can be used to produce the arrangement of data portion error checking information 245 for all of the portions of data 210-1 through 210-16 that comprise an entire application data block 118 in this invention. That is, since a Symmetrix data storage system 150 already natively computes 2-byte XOR values 245, such values can be used within the error detection component of the invention according to the techniques explained herein, which are different than the conventional use of such natively computed 2-byte XOR values 245. However, it is to be understood that the system of the invention may be implemented within any type of data storage system 150, whether the data storage system 150 includes such pre-existing data portion error checking information generation circuitry (i.e., 225) or not.

Upon completion of step 452 in FIG. 5, the processing of the error detection component 170 continues to step 453 in which the error detection component 170 makes the determination if all portions of data 210 are received that comprise an entire application data block 118. In this embodiment, the criteria used to make the determination is a size of the application data block 118 as provided in Part 4 of the configuration command 202 received in step 450. Specifically, since the portions of data 210 which are received via one or more I/O write requests 190 are of a specific size (512 bytes in this example), and since the size of the application data block 118 is known based on information provided in the configuration command 202, the error detection component 170 makes the determination in step 453 if the sum total size of all portions of data 210 received thus far are equivalent in size to the size of an application data block 118.

If the error detection component 170 in step 453 determines that other portions of data 210 still need to be received in order to have a complete application data block 118 available for error detection processing, processing returns to step 451 where steps 451 through 453 are repeated until an entire application data block 118 has been received as a series of portions of data 210.

Next, in step 454, after it has been determined that an entire application data block 118 has been completely received as a series of portions of data 210, the data storage error checking information generator 235 in FIG. 4 computes a 2-byte XOR checksum value for the data storage error checking information 250 by performing a checksum (e.g., and XOR operation) on the entire set of data portion error checking information 250 2-byte XOR values generated as a result of processing steps 451 through 453. As illustrated in FIG. 4, the data storage error checking information generator 235 produces a resulting 2-byte XOR checksum value which is the data storage error checking information 250 in this embodiment. This 2-byte XOR checksum value 250 represents a checksum which the error detection component 170 has at this point in processing computed on all of the application data contained within an application data block 118.

Next, in step 455, the application error checking information extractor 230, as indicated by lines 224 in FIG. 4, extracts the application error checking information 116 from at least one portion of data 210 that has been received. The application error checking information extractor 230 is aware of the location of the application error checking information 16 within one or more portions of data 210 based on Part 3 of the configuration command 202 which indicates the location, for example, as an offset into the application data block 118, of the application error checking information 116. Accordingly, the application error checking information extractor 230 will know precisely which portion of data 210 (or portions) contains, for instance, a checksum value that serves as the application error checking information 116.

As illustrated in this example, the application error checking information 116 is a 4-byte checksum value which exists in at least one portion of data 210 and which was placed in that portion of data 210 by the originator application 114. In other words, the application error checking information extractor 230 extracts the application error checking information 116 which was originally computed by the originator application 114 on the entire set of data within the application data block 118.

Next, in step 456, the application error checking information extractor 230 determines if the application error checking information 116 is comparable in format to the data storage error checking information 250. In this example, the native format of the application error checking information 116 is a 4-byte value. In other words, as illustrated in FIG. 4, this 4-byte XOR checksum value is the checksum format of the application error checking information 116 as defined by the checksum computation algorithm within the originator application 114. In contrast, also as illustrated in FIG. 4, in this example the format of the data storage error checking information 250 is a 2-byte value. Accordingly, the formats of these values are not the same in step 456 and processing proceeds to step 457.

In step 457, the application error checking information extractor 230 converts the application error checking information 116, which in this example is a 4-byte XOR checksum value, into a format that is comparable to the data storage error checking information 250, which in this example is a 2-byte value. This process is shown in detail in FIG. 6.

Figure 6:
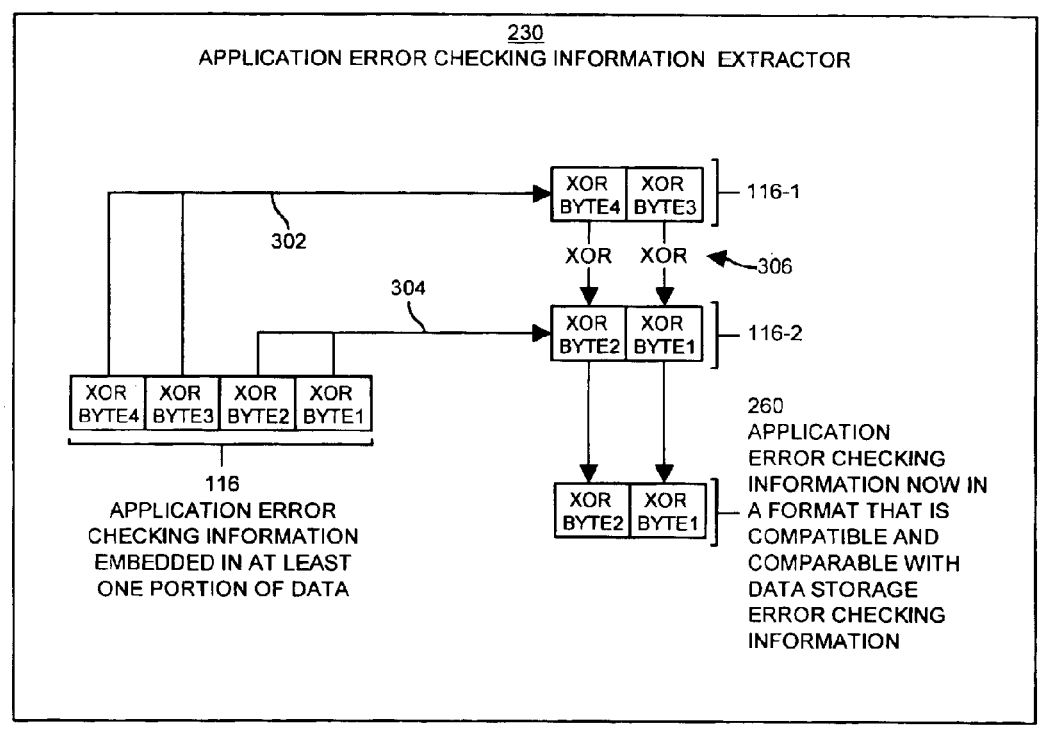
FIG. 6 illustrates how the system of the invention can convert application error checking information, produced by an originator application, to a format that is comparable to data storage error checking information produced by the system of the invention.

FIG. 6 illustrates how the application error checking information extractor 230 can convert application error checking information 116 from an existing format determined by the originator application 114 into a format that is compatible and comparable with the data storage error checking information 250 as produced by the data storage error checking information generator 235 shown in FIG. 4.

The invention is based in part on the observation that application error checking information 116 checksum values computed based on an XOR operation can be manipulated using other XOR operations to reduce the number of bytes in a resulting checksum value in order to provide a format (260) that is comparable to the data storage error checking information value 250. This principle is illustrated in FIG. 6 in which the application error checking information extractor 230 extracts, as shown by lines 302, the last two bytes of the application error checking information 116-1 and the first two bytes of the application error checking information 116-2. The application error checking information extractor 230 then combines, via the XOR operation 306, the last two bytes 116-1 and first two bytes 116-2 of the application error checking information 116 to produce a resulting 2-byte XOR checksum value 260 which, in this embodiment, serves as the application error checking information 260. This value 260 is now in a format that is compatible and comparable with the data storage error checking information 250 (i.e., both are now 2-byte values).

Returning attention now to FIG. 5, once the application error checking information extractor 230 has completed the processing operation of step 457 (as explained above with respect to FIG. 6), or, in the event that the processing in step 456 determines that the application error checking information 260 is in a comparable format to the data storage error checking information 250, processing proceeds to step 458 in FIG. 5 which then directs processing back to step 403 in FIG. 3 which proceeds to operate, as explained above, to compare the checksum values 250 and 260 to determine if they are the same are not, thus indicating if in error has occurred within data in application data block 118.

In this manner, the system of the invention is able to utilize application error checking information 116 embedded within application data transmitted to the data storage system 150 within application data blocks 118 to detect errors that may have occurred in the transmission of the application data block 118s somewhere along the processing path between the originator application 114 and data storage system 150. Since any errors injected into an application data block 118 along this processing path must have occurred in the immediate past (due to the real-time nature of such processing), the system of the invention is able to detect such errors in real-time and is thus able to notify, for example, the operating system 120 and/or the originator application 114 within the server computer system 110 immediately upon detection of such errors.

This contrasts sharply with conventional error detection techniques for application data which may be corrupted since such errors are only detected in conventional systems upon return of the application data from the data storage system 150 back to the originator application 114 in response, for example, to a read I/O request 190. Such I/O read requests for the data in this manner in a conventional system will not detect such errors until the data is subsequently read after being written, which may be days, weeks or even longer periods of time into the future after the error actually occurs.

Moreover, conventional systems which rely on using application error detecting information 116 to detect errors upon return of the data to the originator application 114 can not detect whether or not the errors were introduced on the path of transmission used to send the data to the data storage system 115 (i.e., during the I/O write requests 190), or if the errors occurred during the transmission path upon reading the data (i.e., in response to an I/0 read requests 190) from the data storage system 150 back to the server computer system 110 at some later time in the future. Moreover, since different circuitry, software, and possibly transmission media (e.g., different physical cables or network segments) might be used for the unrelated processes of writing and then subsequently reading data, conventional error detection techniques can not determine which set of equipment and/or software (e.g., read circuitry or write circuitry) is responsible for introducing the errors into the application data. As explained above, the system of the present invention significantly overcomes such limitations by detecting such errors immediately upon receipt of the data within the data storage system 150.

Those skilled in the art will appreciate that other variations of the invention are also possible. For example, the flow charts of processing steps as explained above described processing events in certain sequences. It is to be understood that modifications to the order of these processing steps is possible while still achieving the objectives of the system of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. In a data storage system, a method for detecting errors in data to be stored within the data storage system, the method comprising the steps of:

receiving the data at the data storage system by (i) receiving a portion of data, (ii) generating data portion error checking information for the portion of data, and (iii) repeating the steps of receiving a portion of data and generating data portion error checking information until all portions of data are received that constitute an application data block upon which an application that originates the application data block has computed application error checking information, the data portion error checking information being an N-byte checksum value generated in the data storage system for each portion of data that is received, the application error checking information being an M-byte checksum value computed by the application on all portions of data that constitute the application data block;

receiving the application error checking information at the data storage system;

generating data storage error checking information on the data by computing an N-byte value for the data storage error checking information by performing an exclusive-or on all N-byte checksum values for all portions of data that are received that constitute the application data block, wherein N is different from M such that the format of the application error checking information is incompatible with the format of the data storage error checking information and cannot be compared therewith;

converting each application error checking information M-byte value into a corresponding N-byte value such that the application error checking information is in a compatible format with and can be compared with the data storage error checking information;

comparing the application error checking information, in the format that is compatible with the data storage error checking information, to the data storage error checking information to determine if the data contains an error upon receipt;

if the data contains an error, providing an indication of the error; and if the data does not contain an error, storing the data within the data storage system.

2. The method of claim 1 wherein the application error checking information is embedded within at least one portion of data that is received, and wherein the step of converting includes the step of:

extracting the application error checking information from that at least one portion of data in which the application error checking information is embedded.

3. The method of claim 1 further including the steps of:

receiving a configuration command at the data storage system, the configuration command indicating to the data storage system at least one of:

i) a designation of a portion of storage within the data storage system for storing the data processed by the steps of receiving, generating and comparing;

ii) an indication of areas in the portion of storage that do not contain data including application error checking information;

iii) an indication of a location of application error checking information within an application data block that comprises the data that is received; and iv) an indication of a size of the application data block.

4. The method of claim 3 further including the step of:

in response to receiving the configuration command, designating the portion of storage within the data storage system for storing the data processed by the steps of receiving, generating and comparing, such that data received that is to be stored in the designated portion of storage is subjected to the steps of generating data storage error checking information and comparing the application error checking information to the data storage error checking, and such that an error in the data received that is to be stored in the designated portion of storage is detected upon receipt of the data by the data storage system.

5. The method of claim 3 further including the step of:

in response to receiving the configuration command, the step of generating data storage error checking information on the data received in the data storage system excludes generating data storage error checking information on data that is to be stored within the portion of storage that does not contain data including application error checking information.

6. The method of claim 1 wherein:

the data is database data generated by a database application;

the application error checking information is software generated checksum information generated on portions of the database data by the database application and is embedded within the database data received; and the step of generating data storage error checking information applies, within the data storage system, a data storage error checking checksum algorithm to the database data received that is compatible with a software application error checking algorithm used by the database application to create the application error checking information, such that the data storage error checking algorithm produces a data storage error checking information result that the step of comparing can use to compatibly compare with the application error checking information to determine if the data received contains an error.

7. The method of claim 6 wherein the application error checking information is an embedded checksum received with the database data at a predetermined offset in an application data block.

8. The method of claim 1, wherein if the step of comparing determines that the data received in the data storage system contains an error, the step of providing an indication of the error includes providing, to a software application that originated the data, a rejection of at least one input-output request performed to receive the data in the data storage system.

9. The method of claim 1 wherein M is an integer multiple of N and wherein converting each application error checking information M-byte value into a corresponding N-byte value comprises combining predetermined bytes of the application error checking information to generate the corresponding N-byte value.

10. The method of claim 9 wherein M is equal to 2N and wherein combining predetermined bytes of the application error checking information comprises performing an exclusive-OR operation between the last M/2 bytes and the first M/2 bytes of the application error checking information.

11. The method of claim 10, wherein N is equal to two.

12. The method of claim 9 wherein combining comprises applying an exclusive-OR function.

13. The data storage system of claim 12 wherein M is equal to 2N and wherein combining predetermined bytes of the application error checking information comprises performing an exclusive-OR operation between the last M/2 bytes and the first M/2 bytes of the application error checking information.

14. The data storage system of claim 13 wherein N is equal to two.

15. The data storage system of claim 13 wherein combining comprises applying an exclusive-OR function.

16. A data storage system comprising:
an interface receiving data to be stored in the data storage system and receiving application error checking information, the interface receiving the data by receiving a portion of the data, the application error checking information being an M-byte checksum value computed by the application on all portions of data that constitute an application data block;
an error detection component including a data portion error checking information generator coupled to the interface, a data storage error checking information generator coupled to the data portion error checking information generator, and an application error checking information extractor coupled to the interface;
at least one storage device; and
an interconnection mechanism coupling the interface, the error detection component and the at least one storage device;
wherein the error detection component operates in the data storage system to detect errors in the data by:
generating, by the data portion error checking information generator, data portion error checking information for each portion of data received by the interface, the data portion error checking information being an N-byte checksum value generated by the data portion error checking information generator for each portion of data that is received by the interface;
repeating, by the interface and the data portion error checking information generator, the operations of i) receiving a portion of the data and ii) generating the data portion error checking information until all portions of the data are received by the interface that constitute the application data block;
generating data storage error checking information on the data by computing, by the data storage error checking information generator, an N-byte value for the data storage error checking information by performing an exclusive-or on all data portion error checking information N-byte checksum values for all portions of data that are received by the interface that comprise the application data block, wherein N is different from M such that the format of the application error checking information is incompatible with the format of the data storage error checking information and cannot be compared therewith;
converting, by the application error checking information extractor, the application error checking information M-byte value into an N-byte value such the application error checking information is in a compatible format with and can be compared with the data storage error checking information;
comparing the application error checking information, in the format that is compatible with the data storage error checking information, to the data storage error checking information to determine if the data contains an error upon receipt;
if the data contains an error, providing an indication of the error; and
if the data does not contain an error, storing the data within the at least one storage device in the data storage system.

17. The data storage system of claim 16 wherein:
the application error checking information is embedded within at least one portion of data that is received by the interface and
when the application error checking information extractor converts the application error checking information, the application error checking information extractor extracts the application error checking information from at least one portion of data which the application error checking information is embedded.

18. The data storage system of claim 16 wherein the interface receives a configuration command indicating to the data storage system at least one of:
i) a designation of a portion of storage within that at least one storage device in the data storage system for storing the data processed by the steps of receiving, generating and comparing;
ii) an indication of areas in the portions of storage that do not contain data including application error checking information;
iii) an indication of a location of application error checking information within an application data block that comprises the data that is received; and
iv) an indication of a size of the application data block.

19. The data storage system of claim 18 wherein the interface, in response to receiving the configuration command, causes the data storage system to designate the portion of storage within the data storage system for storing the data processed by the error detection component, such that data received by the interface that is to be stored in the designated portion of storage is subject to processing by the error detection component, and such that an error in the data received that is to be stored in the designated portion of storage is detected upon by the error detection component upon receipt of the data by the data storage system.

20. The data storage system of claim 18 wherein, in response to receiving the configuration command, the error detection component generates data storage error checking information on the data received in the data storage system excludes the data that is to be stored within the portion of storage that does not contain data including application error checking information.

21. The data storage system of claim 16 wherein:
the data is database data generated by a database application;
the application error checking information is software generated checksum information generated on portions of the database data by the database application and is embedded within the database data received; and
the error detection component applies a data storage error checking checksum algorithm to the database data that is compatible with a software application error checking algorithm used by the database application to create the application error checking information, such that the data storage error checking algorithm produces a data storage error checking information result that the error detection component can use to compatibly compare with the application error checking information to determine if the data received contains an error.

22. The data storage system of claim 21 wherein the application error checking information is an embedded checksum received by the error detection component with the database data at a predetermined offset in an application data block.

23. The data storage system of claim 16, wherein if the error detection component determines in the comparing operation that the data received in the data storage system contains an error, the error detection component provides an indication of the error to a software application that originated the data and the interface rejects at least one input-output request performed to receive the data in the data storage system.

24. The data storage system of claim 16 wherein M is an integer multiple of N and wherein converting each application error checking information M-byte value into a corresponding N-byte value comprises combining predetermined bytes of the application error checking information to generate the corresponding N-byte value.

25. A computer program product having a computer-readable medium including computer program logic encoded thereon that when performed on a data storage system, causes the data storage system to detect error in data to be stored in the data storage system, and wherein when the computer program logic is performed on at least one processor in the data storage system, the computer program logic causes the at least one processor to perform the operations of:

receiving the data at the data storage system by (i) receiving a portion of data, (ii) generating data portion error checking information for the portion of data, and (iii) repeating the steps of receiving a portion of data and generating data portion error checking information until all portions of data are received that constitute an application data block upon which an application that originates the application data block has computed application error checking information, the data portion error checking information being an N-byte checksum value generated in the data storage system for each portion of data that is received, the application error checking information being an M-byte checksum value computed by the application on all portions of data that constitute the application data block;

receiving the application error checking information at the data storage system;

generating data storage error checking information on the data by computing an N-byte value for the data storage error checking information by performing an exclusive-or on all N-byte checksum values for all portions of data that are received that constitute the application data block, wherein N is different from M such that the format of the application error checking information is incompatible with the format of the data storage error checking information and cannot be compared therewith;

converting each application error checking information M-byte value into a corresponding N-byte value such that the application error checking information is in a compatible format with and can be compared with the data storage error checking information;

comparing the application error checking information, in the format that is compatible with the data storage error checking information, to the data storage error checking information to determine if the data contains an error upon receipt;

if the data contains an error, providing an indication of the error; and if the data does not contain an error, storing the data within the data storage system.

26. The computer program product of claim 25 wherein the computer program logic, when performed on the at least one processor, causes the at least one processor to further perform the step of:

receiving a configuration command at the data storage system, the configuration command indicating to the data storage system at least one of:

i) a designation of a portion of storage within the data storage system for storing the data processed by the steps of receiving, generating and comparing;

ii) an indication of areas in the portion of storage that do not contain data including application error checking information;

iii) an indication of a location of application error checking information within an application data block that comprises the data that is received; and iv) an indication of a size of the application data block.

27. A data storage system comprising:

an interface including a means for receiving data to be stored in the data storage system and a means for receiving application error checking information, the interface receiving the data by receiving a portion of the data, the application error checking information being an M-byte checksum value computed by the application on all portions of data that constitute an application data block;

an error detection component including a data portion error checking information generator coupled to the interface, a data storage error checking information generator coupled to the data portion error checking information generator, and an application error checking information extractor coupled to the interface;

at least one storage device; and an interconnection mechanism coupling the interface, the error detection component and the at least one storage device;

wherein the error detection component operates in the data storage system to detect errors in the data and includes:

means for generating, by the data portion error checking information generator, data portion error checking information for each portion of data received by the interface, the data portion error checking information being an N-byte checksum value generated by the data portion error checking information generator for each portion of data that is received by the interface;

means for repeating, by the interface and the data portion error checking information generator, the operations of i) receiving a portion of the data and ii) generating the data portion error checking information until all portions of the data are received by the interface that constitute the application data block;

means for generating data storage error checking information on the data by computing, by the data storage error checking information generator, an N-byte value for the data storage error checking information by performing an exclusive-or on all data portion error checking information N-byte checksum values for all portions of data that are received by the interface that comprise the application data block, wherein N is different from M such that the format of the application error checking information is incompatible with the format of the data portion error checking information and cannot be compared therewith;

means for converting, by the application error checking information extractor, the application error checking information M-byte value into an N-byte value such the application error checking information is in a compatible format with and can be compared with the data storage error checking information;

means for comparing the application error checking information, in the format that is compatible with the data storage error checking information, to the data storage error checking information to determine if the data contains an error upon receipt;

means for providing an error indication if the data contains an error; and means for storing the data within the at least one storage device in the data storage system if the data does not contain an error.

28. In a data storage system, a method for detecting errors in data to be stored within the data storage system, the method comprising the steps of:

receiving the data at the data storage system, the data being received as multiple portions of data that constitute an application data block;

generating data portion error checking information for each portion of data in the application data block, the data portion error checking information having an N-byte checksum format;

receiving application error checking information at the data storage system, the application error checking information having an M-byte checksum format;

generating data storage error checking information on the data, the data storage error checking information being generated by combining the data portion error checking information generated for each portion of data that comprises the application data block, the data storage error checking information having an N-byte checksum format, N is different from M such that the format of the application error checking information is incompatible with the format of the data storage error checking information and cannot be compared therewith;

converting the application error checking information into a format that is the same as the format of the data storage error checking information;

comparing the application error checking information, in the format that is compatible with the data storage error checking information, to the data storage error checking information, to determine if the data contains an error upon receipt;

if the data contains an error, providing an indication of the error; and if the data does not contain an error, storing the data within the data storage system.

29. A data storage system comprising:

an interface receiving data to be stored in the data storage system and receiving application error checking information, the data being received as multiple portions of data that constitute an application data block; the application error checking information having an M-byte checksum format;

an error detection component;

at least one storage device; and an interconnection mechanism coupling the interface, the error detection component and the at least one storage device;

wherein the error detection component operates in the data storage system to detect errors in the data by:

generating data portion error checking information for each portion of data in the application data block, the data portion error checking information having an N-byte checksum format;

generating data storage error checking information on the data, the data storage error checking information being generated by combining the data portion error checking information generated for each portion of data that comprises the application data block, the data storage error checking information having an N-byte checksum format, wherein N is different from M such that the format of the application error checking information is incompatible with the format of the data storage error checking information and cannot be compared therewith;

converting the application error checking information into a format that is the same as the format of the data storage error checking information;

comparing the application error checking information, in the format that is compatible with the data storage error checking information, to the data storage error checking information, to determine if the data contains an error upon receipt;

if the data contains an error, providing an indication of the error; and if the data does not contain an error, storing the data within the data storage system.

* * * * *